United States Patent

[11] 3,586,842

[72] Inventor Noboru Murayama
Sagamihara-shi, Japan
[21] Appl. No. 810,754
[22] Filed Mar. 26, 1969
[45] Patented June 22, 1971
[73] Assignee Kabushiki Kaisha Ricoh
Tokyo, Japan
[32] Priority Mar. 29, 1968
[33] Japan
[31] 43-20073

[54] ARITHMETIC CIRCUIT
4 Claims, 2 Drawing Figs.

[52] U.S. Cl. .......... 235/153, 340/146.1
[51] Int. Cl. .......... G06f 11/10, G08b 29/00
[50] Field of Search .......... 340/146.1, 166; 235/153, 156, 174

[56] References Cited
UNITED STATES PATENTS

| | | | |
|---|---|---|---|
| 2,857,100 | 10/1958 | Franck et al. .......... | 235/153 |
| 3,230,355 | 1/1966 | Chu .......... | 340/166 X |
| 3,278,734 | 10/1966 | Ulbrich et al. .......... | 235/174 X |

OTHER REFERENCES

Dunn, W. C. et al. " A Digital Computer For Use In An Operational Flight Trainer." IN IRE TRANS. ELECT. COMP. EC-4 (2): p. 55— 63. June 1955. TK7885.A1.I2.

*Primary Examiner*—Malcolm A. Morrison
*Assistant Examiner*—R. Stephen Dildine, Jr.
*Attorney*—Burgess, Ryan and Hicks

ABSTRACT: An adder circuit and a multiplier circuit are directly connected in cascade into an electronic arithmetic circuit which is utilized in generating or checking the check digit attached to the important codes of the input data to the electronic computer.

INVENTOR

NOBORU MURAYAMA

BY *Burgess, Ryan & Hicks*
ATTORNEYS

ARITHMETIC CIRCUIT

BACKGROUND OF THE INVENTION

The present invention relates to an electronic circuit for arithmetic and more particularly an arithmetic circuit for use in generating or checking the check digit attached to the important codes of the input data to the electronic computer.

The arithmetic circuit of the present invention is comprising a multiplier circuit directly connected to an adder circuit in cascade and operates on the operands according to a predetermined operation program, thereby obtaining the result. In the input data of an electronic computer, the check digits are generally attached to the important codes such as customer codes in most cases. For example, a number which is determined by one arithmetic check process or method is attached to one code. That is, the code 4138 is attached with the number 1 so that it becomes 41381. When such code is used as a customer code, the mistakes or errors in the data processing can be detected when input data is prepared or when the data is fed into an electronic computer.

There have been known various arithmetic check processes or methods. For example, the digits of 4138 are added and the least significant digit of the sum is utilized as check digit. That is, 4+1+3+8=16 so that the check digit is six. However, when the correct code of 41386 is erroneously coded as 41836 in data processing, this error can not be detected by the above process, Such digit error is frequently made by a data processing operator. Therefore, the weights are normally multiplied by each digit of the code number and the least significant digit of the sum is utilized as the check digit. For example, assuming that the weights for digits of the code number 4138 be (7, 6, 5, 4), (4, 1, 3, 8)×(7, 6, 5, 4)=(28, 6, 15, 32)

so that the sum

28+6+15+32=81.

Therefore, the check digit is one so that the customer's code become 41381. In this case, the next least significant digits have no significance in obtaining the least significant digit of the sum of 28+6+15+32 so that the calculation may be carried out in a simple form of

8+6+5+2=21.

This method or process will be referred to as "first method" hereinafter.

Another process or method is such that instead of

28+6+15+32 each digit is added, that is

2+8+6+1+5+3+2=27 and the least significant digit of the sum 27, that is seven is utilized as the check digit. This process or method will be referred to as "second method" hereinafter.

The present invention is to provide an arithmetic circuit for providing or checking the check digit as described above.

SUMMARY OF THE INVENTION

The present invention relates to an arithmetic circuit for providing the check digit of the type described above by performing the above-described single decimal digit multiplication and addition and is comprising a multiplier circuit directly coupled to an adder circuit in cascade.

Generally the above first method can be expressed in the following equation:

$$D=R_{10}\left(\sum_{i=1}^{n} R_{10}(a_i\cdot w_i)\right)$$

where $D$ = check digit, $a_1, a_2, \ldots a_n$ = numbers of digits of an original code, $w_1, w_2, \ldots w_n$ = weights for digits $a_1, a_2, \ldots a_n$, $N$ = decimal number of the original code, $C_{10}(N)$ = quotient after division of $N$ by 10 and $R_{10}(N)$ = remainder. The second method can be expressed in the form of $$D=R_{10}\left(\sum_{i=1}^{n}\left(R_{10}(a_i\cdot w_i)-C_{10}(a_i\cdot w_i)\right)\right)$$

The determination of $D$ and $w_i$ is made based upon the statistical analysis of input data errors. Since the method of this determination forms no part of the present invention, no description will be made in the specification. A group parity code attached to a group of codes is 1 in binary number and since the weights are identical misarrangement is digits can not be detected. The circuit which can perform the addition and multiplication must be provided in order to detect even the misarrangement in digits. Such detection cannot be easily effected by the conventional circuit. It is especially useless to detect the data errors by the electronic computer so that it is preferable to detect such errors in input data processing. The circuit of the present invention is a circuit which can be attached to an input machine.

The above and other objects, features and advantages of the present invention will become more apparent from the following description taken in conjunction with the accompanying drawing.

DESCRIPTION OF THE PREFERRED EMBODIMENT

Figures 1, 2:
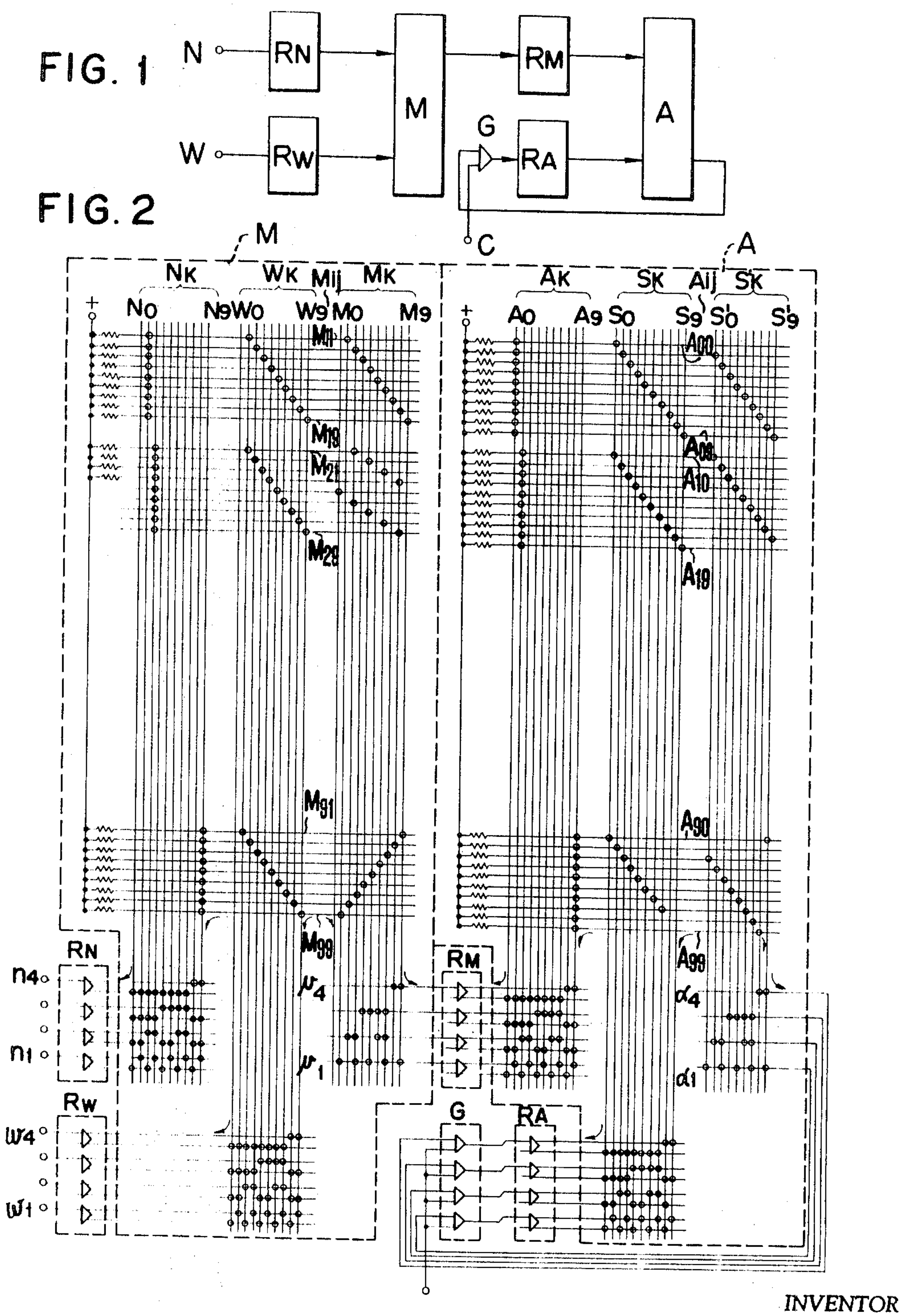
FIG. 1 is a block diagram of one embodiment of the present invention.
FIG. 2 is a detailed view thereof.

Referring now to FIG. 1, each digit of the number of the original code and its weights are applied to registers $R_N$ and $R_W$ from their terminals N and W respectively. The contents in the registers $R_N$ and $R_W$ are multiplied in a multiplier matrix M and the least significant digit of the result is transferred to a register $R_M$. In a register $R_A$ is stored the least significant digit of the previous multiplication. The contents in $R_M$ and $R_A$ are added in an adder matrix A and the result is transferred to the register $R_A$ again through a gate G when a signal C is applied. In the similar manner, each digit of the original code and its weight are applied to the register $R_N$ and $R_W$, thereby obtaining a check digit D.

FIG. 2 is a detailed view of the block diagram of FIG. 1 which is the circuit for representing a decimal number in 4-bit BCD.

Let it be assumed that a number 9 (1001) is applied through terminals $n_4$ to $n_1$ while a number 9 (1001), through terminals $w_4$ to $w_1$. The registers $R_N$ and $R_W$ each having four bits are set by these numbers so that $N_9(=n_1\cdot\overline{n_2}\,\overline{n_3}\cdot n_4)$ and $W_9(=w_1\cdot\overline{w_2}\,\overline{w_3}\cdot w_4)$ are selected. Thereafter, multiplication, decoding and encoding are carried out in the matrix M and (0001) is derived from terminals $\mu_4$ to $\mu_1$. That is the binary code of the least significant digit of the result 81 of 9×9 is obtained. This result is transferred to the register $R_M$.

This will be described in more detail with reference to other number. When number 2 is applied to the register $R_N$, $N_2$ becomes 1 (+E voltage). When number 6 is applied to $R_W$, $W_6$ becomes 1 (+E voltage). When $N_2$ is 1 and $W_6$ is 1, $M_{26}$ becomes 1, thereby driving $M_2$ to 1. Therefore, $\mu_2$ becomes 1. That is $\mu_4$ to $\mu_1$ become (0010) ) which is 2 in the decimal number. This means that the least significant digit of the result of 2×6=12, that is two is represented in the binary number.

As described above, the terminals $M_{ij}$ ($M_{11}$ to $M_{19}$, $M_{21}$ to $M_{29}$, ...,$M_{91}$ to $M_{99}$) of the matrix M are decoding terminals whose outputs are determined by the inputs to the registers $R_N$ and $R_W$. The terminals $M_K$ ($M_0$ to $M_9$) are encoding terminals selected by the sequence of connection of diodes from the terminals $M_{ij}$. The terminals $\mu_4$ to $\mu_1$ are parallel output terminals. Therefore, in the matrix M, multiplication, decoding and encoding are carried out and the results are obtained in the form of the binary code at the output terminals.

The results obtained at the terminals $\mu_4$ to $\mu_1$ sets the register $R_M$, thereby selecting one of the terminals $A_K$ ($A_0$ to $A_9$) of the matrix A. For example, when the outputs of the terminals $\mu_4$ to $\mu_1$ are 0001 (=1 in decimal number), the terminal $A_1$ becomes 1 (+E voltage).

In this case, if 6 is stored in the register $R_A$, $S_6$ of $S_K$($S_0$ to $S_9$) becomes 1 so that among their terminals $A_{ij}$ ($A_{00}$ to $A_{09}$, $A_{10}$ to $A_{19}$, ....., $A_{90}$ to $A_{99}$) $A_{16}$ becomes 1 so that among $S_K$, ($S_1$, to $S'_9$), $S'_7$ becomes 1. Therefore, the result of addition 7 (0111) are derived from the terminals $\alpha_4$ to $\alpha_1$.

As described above, the terminals $A_{ij}$ are the decoding terminals which are set in response to the inputs to the register $R_M$ and $R_A$; the terminals $S_K'$ are the encoding terminals whose outputs are determined by a sequence of connection of diodes from the terminals $A_{ij}$; and $\alpha_4$ to $\alpha_1$ are the parallel output terminals. Therefore, the addition, decoding and encoding are carried out in the matrix A and the results are derived from the output terminals in the form of a binary code.

The outputs from the terminals $\alpha_4$ to $\alpha_1$ set the register $R_A$ upon arrival of the pulse signal C which opens the gate G. Therefore, in the register $R_A$ is stored 7 (=1 +6).

The above-discussed operations are cycled for each digit of the original code and the weights and after all operations, the check digit D is obtained.

The matrix M has been shown as being the matrix for carrying out the addition of the least significant digits, that is $9\times9=81\rightarrow1$. However, the second method of adding the lest significant digit and the next least significant digit, that is $9\times9=81\rightarrow 8+1=9$, can be effected by changing the arrangement of diodes in the circuits. So far the invention has been described with particular reference to the case in which the remainder after division of a number by 10 is utilized, but it will be easily seen that the remainder after division of a number by 11 may be also utilized by changing the sequences of connections of diodes from the decoding terminals $M_{ij}$ of the matrix M to the encoding terminals $M_K$ and from the matrix $A_{ij}$ to the encoding terminals $S'_K$.

In the embodiment, the decoding terminals of the multiplier matrix M and the adder matrix A are provided for all combinations of the results of addition and multiplication, but the circuit which can operate the same function as that of the embodiment and whose size is about one-fourth of that of the embodiment may be realized by adding the complement coders at the input and output of the matrix.

According to the present invention, the output terminals of the multiplier circuit are directly coupled to the input terminals of the adder circuit so that both of the circuits are integrally connected in cascade so that the arithmetic circuit can be made simple in construction and compact in size. According to the present invention a multiplier circuit for single or individual decimal digit is connected in cascade so that the check digits can be easily provided. Furthermore, the results by the operation in the matrix are determined by the connections of the diodes from the decoding terminals to the encoding terminals so that the modifications of the design can be easily effected depending upon the process or method for providing different check digits.

The present invention has been so far described with particular reference to one embodiment thereof, but it will be understood that variations and modifications can be effected without departing from the true spirit of the present invention as described hereinafter and as defined in the appended claims.

I claim:

1. An arithmetic logic circuit for computing check digits for coded digital input signals, said circuit comprising:
   - a first register for receiving said input signals,
   - a diode matrix multiplier circuit connected to said first register for multiplying said digital input signals with weighting signals and providing outputs,
   - a diode matrix adder circuit with inputs effectively connected to said multiplier circuit for adding together outputs from said multiplier circuit with the contents of an accumulator register and providing outputs, and
   - gate means connected between outputs of said adder circuit and said accumulator register for passing the outputs of said adder circuit to said accumulator upon receipt of a gating signal thereby updating the contents of the accumulator.

2. An arithmetic circuit as in claim 1 further comprising a second register connected between the outputs of said multiplier circuit and the inputs of said adder circuit for sensing the outputs of said multiplier circuit and driving the inputs of said adder circuit.

3. An arithmetic circuit as in claim 2 wherein
   - said diode matrix multiplier circuit and said diode matrix adder circuit have a plurality of inputs and outputs representing the plural binary digits of a binary coded decimal digit, and further comprising
   - weighting input means connected to a group of inputs of said multiplier circuit whereby different weighting values may be multiplied with different coded decimal digits thus permitting each ordinal place of a coded decimal number to be differently weighted.

4. An arithmetic circuit as in claim 3 wherein said weighting input means comprises a register.